United States Patent
Hamana et al.

(10) Patent No.: US 6,698,897 B2
(45) Date of Patent: Mar. 2, 2004

(54) PRESENTATION SYSTEM USING LASER POINTER

(75) Inventors: Akinori Hamana, Saitama (JP); Mitsuyoshi Nishimura, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 32 days.

(21) Appl. No.: 10/200,288

(22) Filed: Jul. 23, 2002

(65) Prior Publication Data

US 2003/0025884 A1 Feb. 6, 2003

(30) Foreign Application Priority Data

Aug. 1, 2001 (JP) .......................... 2001-233152

(51) Int. Cl.[7] .................... G03B 21/00; G09G 5/08
(52) U.S. Cl. .......................... 353/42; 345/158
(58) Field of Search .................... 353/42; 345/157, 345/158, 169, 183, 163; 359/142, 143

(56) References Cited

U.S. PATENT DOCUMENTS

| | | | |
|---|---|---|---|
| 6,260,973 B1 * | 7/2001 | Minato et al. ............. | 353/42 |
| 6,361,173 B1 * | 3/2002 | Vlahos et al. ............. | 353/97 |
| 6,417,840 B1 * | 7/2002 | Daniels ............. | 345/158 |
| 6,587,092 B2 * | 7/2003 | Yoneno ............. | 345/158 |
| 6,598,978 B2 * | 7/2003 | Hasegawa ............. | 353/42 |
| 2003/0132912 A1 * | 7/2003 | Hamana et al. ............. | 345/156 |

FOREIGN PATENT DOCUMENTS

| JP | A 10-4228 | 1/1998 |
|---|---|---|
| JP | A 2000-321530 | 11/2000 |

* cited by examiner

*Primary Examiner*—Russell Adams
*Assistant Examiner*—Andrew Sever
(74) *Attorney, Agent, or Firm*—Oliff & Berridge, PLC

(57) ABSTRACT

A presentation system comprises a screen, a laser pointer operated by a user to project laser beam on the screen, and an infrared light projector for emitting infrared light on the entire surface of the screen. The laser pointer comprises an infrared light receiving section directed in the same direction as a projection direction of laser beam for receiving infrared light projected from the infrared light projector and reflected from the screen, and a control section for causing the laser pointer to project laser beam only while the infrared light receiving section is receiving infrared light.

6 Claims, 3 Drawing Sheets

PRESENTATION SYSTEM USING LASER POINTER

BACKGROUND OF THE INVENTION

1. Field of the Invention

The present invention relates to a presentation system used in a lecture or the like which is performed while indicating a point on an image projected on a screen by a laser pointer, and in particular, relates to a development of a system for using a laser pointer safely.

2. Description of the Related Art

In a case in which a presentation such as a lecture is performed using a liquid crystal projector or the like, a laser pointer for projecting laser beam on a screen to indicate a point for attention thereon is often used. With such a laser pointer, there is a risk that the laser beam will be made incident on the eye of a person in the audience due to an erroneous emission. In Japanese Patent Application Laid-Open (JP-A) 10-4228 publication, as a safety measure for avoiding such a risk, there has been disclosed a technique in which emission of laser beam is automatically turned on/off according to the brightness of an object (a screen or the like) at which the laser beam is directed, and the laser beam is emitted only when the brightness of the object to be projected on exceeds a predetermined threshold value. Also, in JP-A 2000-321530 publication, there has been disclosed a technique in which an angle in a vertical direction or a horizontal direction is detected, and a laser beam is emitted only when the angle is in a predetermined angle range.

In the safety measures disclosed in each of these publications, since a laser beam is emitted if the apparatus disclosed therein should not operate precisely, such a measure cannot be a basic measure. That is, in the technique disclosed in the former publication, a place other than the screen may have a brightness exceeding the threshold value due to an illumination condition, and the laser beam may be projected to that place even when some people in the audience are located therein. Also, in the technique disclosed in the latter publication, since some people of an audience are found within a projection angle of a laser beam due to there being such sites such as a stair seat, a second floor seat, or the like, a laser beam may be directed to the people located in such sites.

SUMMARY OF THE INVENTION

Accordingly, an object of the present invention is to provide a presentation system using a laser pointer, which can reliably prevent an erroneous emission of laser beam and can establish sufficient safety.

According to a first aspect of the present invention, there is provided a presentation system comprising a screen, a laser pointer operated by a user to project laser beam on the screen, and an infrared light projector for emitting infrared light on the entire surface of the screen. The laser pointer comprises an infrared light receiving section directed in the same direction as a projection direction of laser beam for receiving infrared light projected from the infrared light projector and reflected from the screen, and a control section for causing the laser pointer to project laser beam only while the infrared light receiving section is receiving infrared light.

According to the first aspect of the invention, when the laser pointer is directed to the screen, the infrared light receiving section provided at the laser pointer receives infrared light reflected from the screen. At this time, laser beam is emitted from the laser pointer and the laser beam is projected onto the screen. On the other hand, when the laser pointer is directed away from the screen, the infrared light receiving section does not receive the infrared light reflected from the screen so that laser beam is not projected. That is, only when the laser pointer is directed toward the screen, a laser beam is projected. Accordingly, erroneous emission of laser beam is prevented beforehand so that a presentation can be performed safely.

Next, according to a second aspect of the invention, there is provided a presentation system comprising: a screen; a laser pointer operated by a user to project laser beam on the screen; an infrared light projector provided in the laser pointer for emitting infrared light in the same direction as an emission direction of laser beam; an infrared light receiving section for receiving infrared light emitted from the infrared light projector and reflected from the screen; and a control section for causing the laser pointer to project laser beam only while the amount of light received by the infrared light receiving section is equal to or greater than a predetermined amount.

According to the second aspect of the invention, when the laser pointer is directed to the screen, infrared light is projected on a screen from the infrared light projector provided in the laser pointer, and the infrared light is reflected by the screen to be received on the infrared light receiving section. In this case, when the amount of light received by the infrared light receiving section becomes equal to or greater than the predetermined amount, laser beam is projected from the laser pointer by the control section, and the laser beam is projected onto the screen. On the other hand, when the laser pointer is directed away from the screen, since the emitted amount of infrared light projected on the screen from the infrared light projector decreases and the reception amount of infrared light received by the infrared light receiving section also decreases to less than the predetermined amount, laser beam is not projected. That is, laser beam is projected only when the laser pointer is directed to the screen. Accordingly, erroneous emission of laser beam is prevented beforehand so that a presentation can be made safely.

BRIEF DESCRIPTION OF THE DRAWIGNS

PREFERRED EMDODIMENT OF THE INVENTION

Embodiments of the present invention will be explained below with reference to the drawings.

(1) First Embodiment

Figure 1:
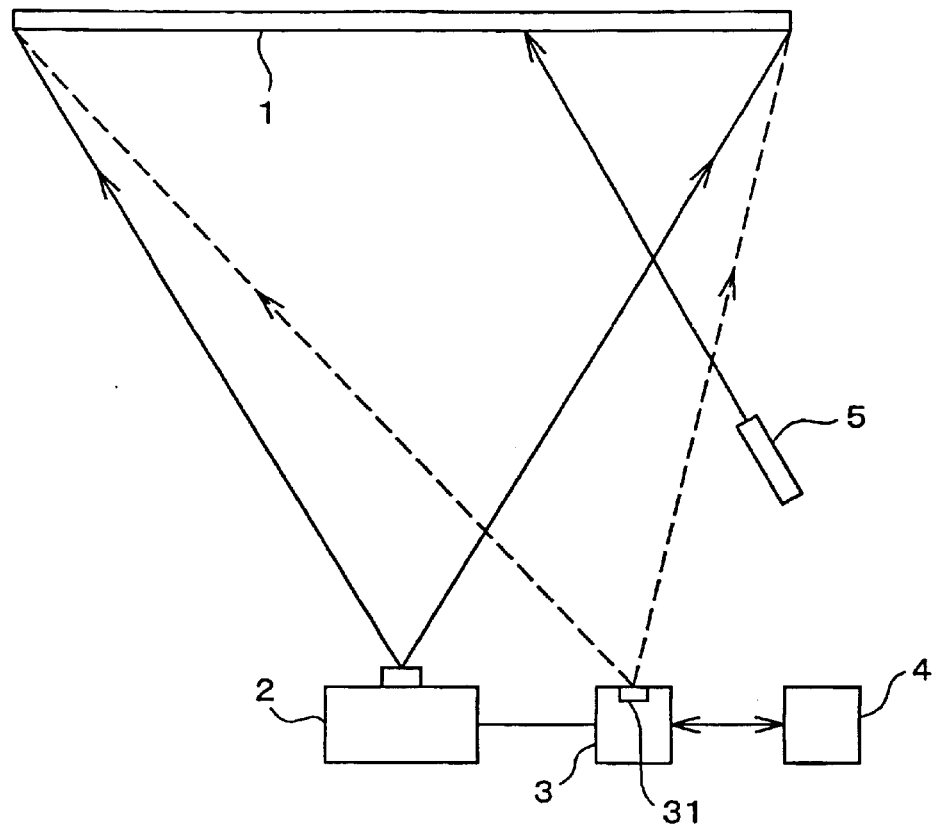
FIG. 1 is a schematic diagram of a system according to a first embodiment of the present invention.

FIG. 1 conceptually shows an overall system of a first embodiment based upon a first aspect of the present invention. In the figure, reference numeral 1 denotes a screen, 2 denotes a liquid crystal projector which projects a liquid crystal image on the screen 1, 3 denotes an image processing section, and 4 denotes a personal computer (hereinafter, referred to as "PC"). Data for a liquid crystal image is produced in the PC 4, and the image data and various commands are inputted into the image processing section 3 from the PC 4. Then, image data processed in the image processing section 3 is input into the liquid crystal projector 2, and an image based upon the image data is projected as a visible image on the screen 1 from the liquid crystal projector 2.

In the image processing section 3, an infrared light emitting section (infrared light projector) 31 which projects infrared light on the entire surface of the screen 1 is provided. The wavelength of the infrared light emitted from the infrared light projecting section 31 is in the range of, for example, about 800 to 950 nm, which is remarkably different from the wavelength of about 10 μm of infrared light emitted from the human body.

Figure 2:
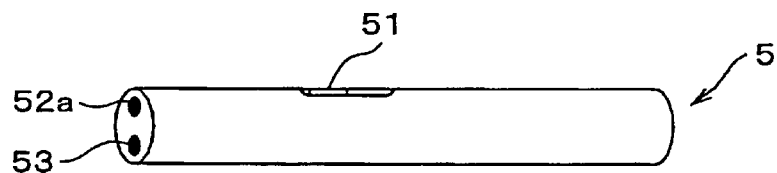
FIG. 2 is a perspective view of a laser pointer according to the first embodiment of the present invention.
Figure 3:
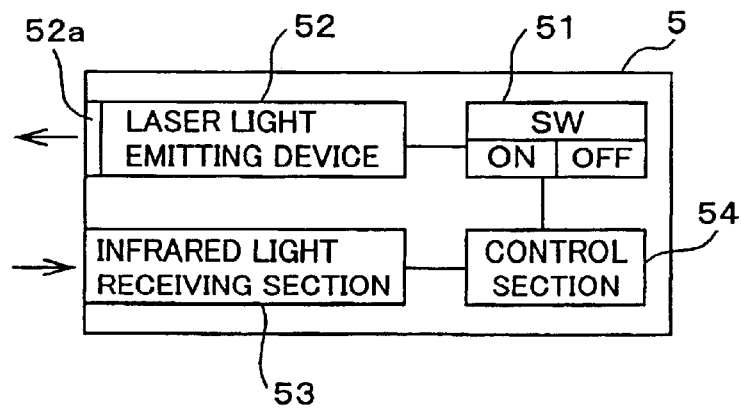
FIG. 3 is a block diagram showing a configuration of the laser pointer according to the first embodiment of the present invention.

Reference numeral 5 in FIG. 1 is a laser pointer handled by a presenter. FIG. 2 shows the laser pointer 5. FIG. 3 is a block diagram showing a configuration of the laser pointer 5. A presenter (not shown) directs a tip end of the laser pointer 5 towards the screen 1 and pushes (turns ON) a switch 51 so that laser beam is emitted towards the screen 1 from a projecting section 52a of a laser beam emitting device 52.

In the laser pointer 5, an infrared light receiving section (infrared light receiving means) 53 which is directed in the same direction as a projection direction of laser beam and which receives infrared light emitted from the infrared light projecting section 31 and reflected from the screen 1 is provided. Infrared light projected from the infrared light projecting section 31 is reflected by the screen 1 so that the amount of the light is attenuated and the amount of the infrared light received by the infrared light receiving section 53 is set within the range of the attenuated light amount.

As shown in FIG. 3, a control section 54 which turns ON/OFF the drive of the laser beam emitting device 52 is provided in the laser pointer 5. When the switch 51 is in the ON state, the control section 54 drives the laser beam emitting device 52 only when the infrared light receiving section 53 is receiving infrared light, and it stops the drive of the laser beam emitting device 52 when infrared light is not received. That is, such a control is performed by the control section 54 so that while infrared light is being received by the infrared light receiving section 53, laser beam is emitted from the laser pointer 5 by the control section 54, but laser beam is not emitted while the infrared light is not received.

According to the first embodiment, a presenter directs the laser pointer 5 towards the screen 1 on which a visual image is projected from the liquid crystal projector 2, turns on the switch 51 to emit laser beam so that the presenter conducts a presentation while the presenter is indicating a portion on a visual image by the laser beam. Here, in the state where the laser pointer 5 is being directed towards the screen 1, since the infrared light receiving section 53 receives infrared light reflected from the screen 1, laser beam is projected on the screen 1 from the laser pointer 5 at this time. On the other hand, when the direction of the laser pointer 5 deviates from the screen 1, the infrared light receiving section 53 does not receive infrared light reflected from the screen 1 and laser beam is not emitted. That is, laser beam is emitted only while the presenter is directing the laser pointer 5 towards the screen 1.

Figure 4:
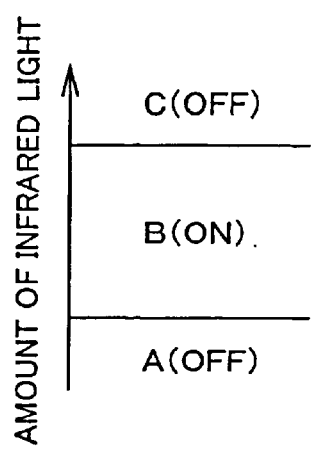
FIG. 4 is a diagram conceptually showing ON/OFF states of the laser pointer in response to the range of light amount of infrared light.

FIG. 4 shows a state where projection of laser beam is turned ON/OFF according to a change in the amount of infrared light reflected by the screen 1. In a case (range of B) in which laser pointer 5 is directed towards the screen 1 and the amount of infrared light received is in a predetermined range, laser beam is emitted. Also, in a case (range of C) in which the laser pointer 5 is directed to a region of infrared light which is being projected from the infrared light projecting portion 31, laser beam is not emitted. Furthermore, even in a case (range of A) in which the laser pointer 5 is directed to a region other than the screen 1 and a region of infrared light which is being projected from the infrared light projecting section 31, laser beam is not emitted. Accordingly, erroneous emission of laser beam is prevented beforehand so that a presentation can be conducted safely.

(2) Second Embodiment

Figure 5:
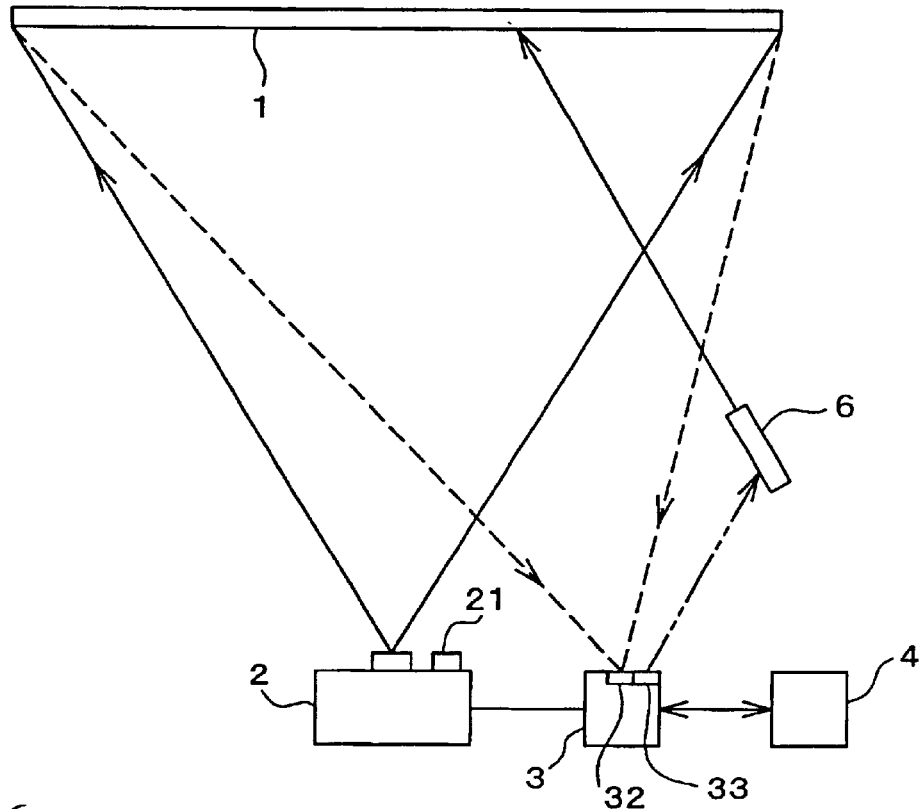
FIG. 5 is a schematic diagram of a system according to a second embodiment of the present invention.

FIG. 5 schematically shows an overall system of a second embodiment of a second aspect of the present invention, where a screen 1, a liquid crystal projector 2, an image processing section 3, and a PC 4 are provided as in the first embodiment.

Figure 6:
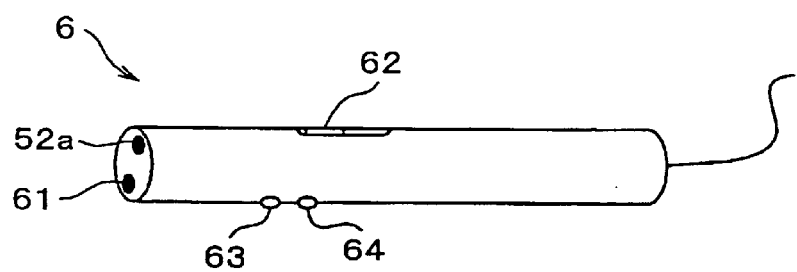
FIG. 6 is a perspective view of a laser pointer according to the second embodiment of the present invention.
Figure 7:
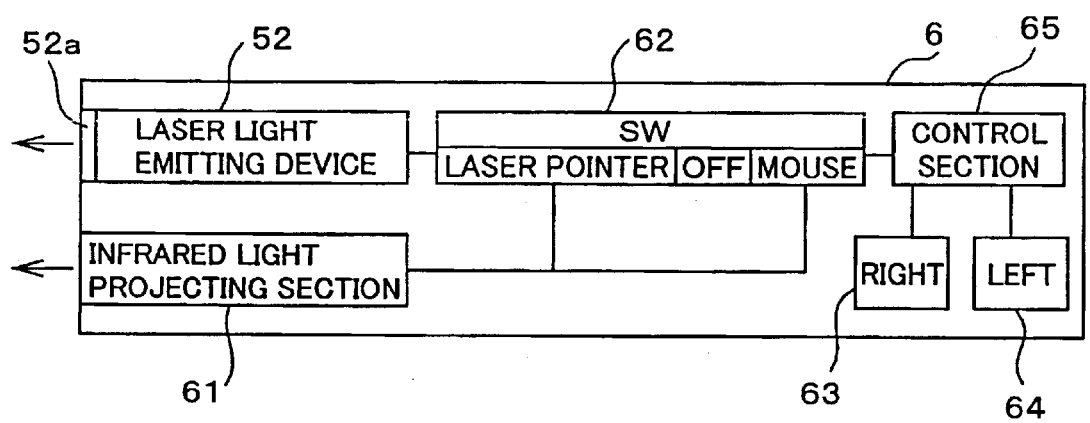
FIG. 7 is a block diagram showing a configuration of the laser pointer according to the second embodiment of the present invention.

FIG. 6 is a perspective view showing a laser pointer 6 of a second embodiment, and FIG. 7 is a block diagram showing a configuration of the laser pointer 6. The laser pointer 6 is provided with a laser beam emitting device 52 and a laser beam emitting portion 52a, and it is further provided with an infrared light emitting portion (infrared light projector) 61. The projection direction of infrared light from the infrared light projecting section 61 is set in substantially the same direction as a projection direction of laser beam projected from the laser beam emitting section 52a. Accordingly, when the laser pointer 6 is directed towards the screen 1, infrared light is projected on the screen 1. The wavelength of infrared light emitted from the infrared light emitting section 61 is in a range of 800 to 950 nm or so, which is substantially different from the wavelength of about 10 μm of infrared light emitted by the human body.

A switch 62 which switches a use mode between a laser pointer mode and a mouse mode via an OFF position is provided on the laser pointer 6. When the switch 62 is switched from the OFF position to the laser pointer mode, the laser beam emitting device 52 is driven to emit laser beam, and when the switch 62 is switched to the mouse mode, the laser beam emitting device 52 remains to be stopped and the laser pointer 6 can be used instead of a mouse. In either mode, infrared light is emitted from the infrared light projecting section 61. Also, a right button 63 and a left button 64 which are used in the mouse mode are provided on the laser pointer 6. A mode switching signal from the switch 62 and respective operation signals from the respective buttons 63 and 64 are supplied to a control section 65, and the control section 65 receives a signal from a control section 33 provided at the infrared light receiving section 32, described later, and it controls driving of the laser beam emitting device 52 on the basis of the signal.

In the image processing section 3, an infrared light receiving section (infrared light receiving means) 32 which receives infrared light emitted from the infrared light emitting section 61 of the laser pointer 6 and reflected from the screen 1 is provided. Infrared light projected from the infrared light projecting section 61 of the laser pointer 6 is reflected by the screen 1 so that the amount of light is attenuated and the amount of infrared light received by the infrared light receiving section 32 is set within the range of the attenuated light amount.

The received amount of infrared light received by the infrared light receiving section 32 is sequentially detected by the control section 33 provided in the image processing section 3, and a signal for drive/non-drive of the laser beam emitting device 52 is sent from the control section 33 to the control section 65 of the laser pointer 6 according to the amount of light received. Specifically, when the switch 62 is in the laser pointer mode, when the amount of light received by the infrared light receiving section 32 is equal to or greater that a predetermined amount, a drive signal for the laser beam emitting device 52 is transmitted, but when the amount of light received by the infrared light receiving section 32 is less than the predetermined amount, a drive stopping signal for the laser beam emitting device 52 is transmitted. That is, a feedback control is performed so that while the infrared light receiving section 32 is receiving the predetermined amount of infrared light, laser beam is emitted from the laser pointer 6, but the laser beam is not emitted when the amount of received light is less than the predetermined amount.

Also, an infrared light sensing section 21 which shoots a projection image of infrared light projected on the screen 1 from the laser pointer 6 is provided in the liquid crystal projector 2. The infrared light sensing section 21 is constituted with an image pick-up device such as a CCD, PSD or the like, and it senses the center of the projected image of the infrared light. When the switch 62 of the laser pointer 6 is set to the mouse mode and the laser pointer 6 is moved towards the screen 1 in this state, the projection image of infrared light moves on the screen 1 and the movement is detected by the infrared light detecting section 21. The movement direction and the movement distance of the center of the projection image of infrared light on the screen 1, which are detected by the infrared light sensing section 21 are supplied to the image processing section 3, and the image processing section 3 produces a mouse pointer image on the basis of the data about the movement to supply the data to the liquid crystal projector 2. Thereby, a mouse pointer image corresponding to the movement of the laser pointer 6 is synthesized with the visible image, and the synthesized image is projected on the screen 1.

Also, by performing an operation similar to a mouse operation while pressing the left button 63 or the right button 64 of the laser pointer 6 in this mouse mode, various commands (for example, designating a region, scrolling an image, turning a page and the like) can be reflected by an visual image.

In the above-described second embodiment, in the state in which the laser pointer 6 in the laser pointer mode is directed towards the screen 1, infrared light is projected on the screen 1 from the infrared light projecting section 61, and the infrared light is reflected by the screen 1 to be received on the infrared light receiving section 32. In this case, the amount of light received by the infrared light receiving section 32 is equal to or greater than the predetermined amount so that laser beam is projected on the screen 1 from the laser pointer 6. On the other hand, in the state in which the direction of the laser pointer 6 is away from the screen 1, the projection amount of infrared light emitted from the infrared light emitting section 61 to the screen 1 decreases and the amount of light received by the infrared light receiving section 32 also decreases to less than the predetermined amount. At this time, a drive stopping signal is generated from the control section 33 so that projection of laser beam is stopped. That is, only while the laser pointer 6 is directed to the screen 1, laser beam is emitted, so that erroneous emission of laser beam is prevented beforehand and presentations can be conducted safely.

What is claimed is:

1. A presentation system comprising:

a screen;

a laser pointer operated by a user to project laser beam on the screen; and an infrared light projector for emitting infrared light on the entire surface of the screen;

wherein the laser pointer comprises:

an infrared light receiving section directed in the same direction as a projection direction of laser beam for receiving infrared light projected from the infrared light projector and reflected from the screen; and a control section for causing the laser pointer to project laser beam only while the infrared light receiving section is receiving infrared light.

2. The presentation system according to claim 1, wherein the infrared light projector emits infrared light having a wavelength in the range of 800 to 950 nm.

3. A presentation system comprising:

a screen;

a laser pointer operated by a user to project laser beam on the screen;

an infrared light projector provided in the laser pointer for emitting infrared light in the same direction as an emission direction of laser beam;

an infrared light receiving section for receiving infrared light emitted from the infrared light projector and reflected from the screen; and a control section for causing the laser pointer to project laser beam only while the amount of light received by the infrared light receiving section is equal to or greater than a predetermined amount.

4. The presentation system according to claim 3, wherein the infrared light projector emits infrared light having a wavelength in the range of 800 to 950 nm.

5. The presentation system according to claim 3, wherein the laser pointer includes a switch for switching a use mode between a laser pointer mode and a mouse mode, and a click button used in the mouse mode.

6. The presentation system according to claim 5, wherein command images including scrolling an image and turning a page are projected on the screen, and the commands are performed by operating the click button in the mouse mode.

* * * * *